US008062409B2

(12) United States Patent
Käske

(10) Patent No.: US 8,062,409 B2
(45) Date of Patent: Nov. 22, 2011

(54) CLEANING DEVICE AND METHOD FOR CLEANING A WORKPIECE

(75) Inventor: Egon Käske, Aachen (DE)

(73) Assignee: Dürr Ecoclean GmbB, Filderstadt (DE)

( * ) Notice: Subject to any disclaimer, the term of this patent is extended or adjusted under 35 U.S.C. 154(b) by 395 days.

(21) Appl. No.: 12/357,852

(22) Filed: Jan. 22, 2009

(65) Prior Publication Data

US 2009/0173227 A1 Jul. 9, 2009

Related U.S. Application Data

(63) Continuation of application No. PCT/EP2007/006848, filed on Aug. 2, 2007.

(30) Foreign Application Priority Data

Aug. 23, 2006 (DE) ......................... 10 2006 039 507

(51) Int. Cl.
*B01D 46/00* (2006.01)

(52) U.S. Cl. ............. 95/284; 55/385.2; 55/417; 55/420; 55/467; 134/21; 134/22.1; 134/25.1; 134/166 R; 134/169 R

(58) Field of Classification Search ................. 55/282.3, 55/302, 303, DIG. 30; 95/279, 280, 283, 95/284; 15/301; 96/111, 116, 136, 121; 134/21, 25.1, 26, 30, 32, 132, 133; 137/15.04, 137/238; 426/427
See application file for complete search history.

(56) References Cited

U.S. PATENT DOCUMENTS 3,915,739 A 10/1975 Maahs et al.
6,920,891 B2 * 7/2005 Lin et al. .................... 137/15.04
7,384,455 B2 * 6/2008 Sellers et al. ................... 95/280
2003/0131732 A1 * 7/2003 Kim ................................ 96/111
2006/0037168 A1 2/2006 Hahmen et al.
2009/0155437 A1 * 6/2009 Bohnert et al. ............... 426/427
2009/0288684 A1 * 11/2009 Kitaoka et al. .................. 134/21

FOREIGN PATENT DOCUMENTS

DE 3900664 7/1990
DE 3934095 4/1991
DE 4327150 2/1995
DE 19601436 7/1997
DE 19629436 1/1998
DE 29717946 3/1999

OTHER PUBLICATIONS

International Searching Authority, International Search Report for PCT/EP2007/006848, Oct. 30, 2007, 4 pages.

German Office Action for Application DE 10 2006 039 507.7, May 23, 2007, 4 pages.

Canadian Intellectual Property Office, Office Action issued in CA Application No. 2,661,368, dated Feb. 2, 2011, 3 pages.

* cited by examiner

*Primary Examiner* — Duane Smith
*Assistant Examiner* — Minh-Chau Pham
(74) *Attorney, Agent, or Firm* — Hanley, Flight & Zimmerman, LLC.

(57) ABSTRACT

In order to produce a cleaning device for cleaning a work-piece including a suction apparatus for sucking out impurities from an interior of the work piece wherein the suction apparatus has a particularly large suction effect, it is proposed that the suction apparatus at least one vacuum tank, at least one evacuation device for evacuating the vacuum tank, at least one ventilation line for connecting the vacuum tank to the work-piece and at least one blocking device for blocking off the connection between the vacuum tank and the workpiece.

46 Claims, 3 Drawing Sheets

CLEANING DEVICE AND METHOD FOR CLEANING A WORKPIECE

RELATED APPLICATION

This application is a continuation application of PCT/EP2007/006848 filed Aug. 2, 2007, the entire specification of which is incorporated herein by reference.

FIELD OF DISCLOSURE

The present invention relates to a cleaning device for cleaning a workpiece which comprises a suction apparatus for sucking out impurities from an interior of the workpiece.

BACKGROUND

Known industrial suction systems have a suction power within the range of approximately 15,000 Pa to approximately 35,000 Pa. The suction power of this industrial suction system is too small for reliably removing impurities from the cavities of workpieces especially workpieces such as have been subjected to a machining process.

SUMMARY OF THE INVENTION

The object of the present invention is to produce a cleaning device of the kind specified hereinabove which comprises a suction apparatus having a particularly large suction effect.

In accordance with the invention, this object is achieved in the case of a cleaning device in that the suction apparatus comprises at least one vacuum tank, at least one evacuation device for evacuating the vacuum tank, at least one ventilation line for connecting the vacuum tank to the workpiece and at least one blocking device for blocking off the connection between the vacuum tank and the workpiece.

As a result of the processes of evacuating the vacuum tank and subsequently opening the blocking device, there is a very high difference of pressure between the interior of the vacuum tank and the interior of the workpiece so that a large negative pressure is produced in each of the cavities in the workpiece that are connected by the ventilation line to the vacuum tank, this thereby causing the ambient air to penetrate at high speed into each of the openings which lead to the cavities in the workpiece that are connected to the ventilation line so that the contaminating particles which are located therein are whirled up and entrained towards the ventilation line and then through the ventilation line.

The contaminating particles are conveyed in this way to the vacuum tank or to a separating device connected between the vacuum tank and the workpiece and are separated therein from the air stream produced by the opening of the blocking device.

In contrast to known suction systems, the cleaning device in accordance with the invention has the advantage that a very high difference of pressure of e.g. 900 mbar to 940 mbar between the interior of the vacuum tank and the interior of the workpiece can be effective herein, this being significantly bigger than the difference of pressure that is capable of being produced in industrial suction systems.

The cleaning device in accordance with the invention is particularly suitable as an industrial cleaning device for sequentially cleaning a multiplicity of workpieces, and in particular, workpieces such as have been subjected to a machining process.

The cleaning device in accordance with the invention is particularly suitable for removing processing residues, such as metal chips, blasting abrasives, moulding sand and processing liquids for example, from the interiors of workpieces having a complex geometry such as cylinder heads or crank cases for example.

The cleaning device in accordance with the invention is also particularly suitable for cleaning the narrow and heavily branched channels used for conveying cooling water in a motor car's cylinder head. Metal chips fall into these cooling water channels during the mechanical working thereof. It is possible to remove such loose metal chippings lying in the cooling water channels from the workpiece by means of the cleaning device in accordance with the invention.

In contrast to a process of flushing out the interior of the workpiece with a liquid, the cleaning device in accordance with the invention offers the advantage that dead areas in the stream of liquid in which particles could remain cannot develop within the workpiece.

In order to produce particularly large suction powers, it is of advantage if the vacuum tank is evacuable to a pressure of at most approximately 100 mbar, preferably to at most approximately 50 mbar.

Furthermore, for the purposes of producing a powerful air stream through the workpiece when ventilating the vacuum tank, it is of advantage if the blocking device can be opened abruptly.

In particular, it is of advantage, if the blocking device can be fully opened within a period of at most approximately 2 seconds, preferably of at most approximately 0.5 seconds.

In a preferred embodiment of the invention, provision is made for the vacuum tank to be adapted to be ventilated within an opening time of the blocking device of at most approximately 2 seconds in such a manner that its internal pressure amounts to at least 90% of the external pressure. It is in this way possible to generate a particularly powerful flow of air through the workpiece into the vacuum tank, this thereby reliably removing the particles present in the interior of the workpiece.

The workpiece requiring cleaning preferably comprises at least one cavity which opens out at least one point on the exterior of the workpiece. This point of opening into the exterior of the workpiece is connected to the vacuum tank by the ventilation line.

In dependence on the nature and size of the workpiece requiring cleaning, it can be of advantage if the suction apparatus comprises a plurality of ventilation lines which can be arranged at different positions on the exterior of the work piece at the same time.

In order to enable these ventilation lines to be activated mutually independently, it is of advantage if at least two of the ventilation lines are adapted to be blocked separately by means of at least two mutually different blocking devices.

If the at least two blocking devices can be opened at the same time, then a particularly powerful air stream through the workpiece and the two ventilation lines can thereby be produced.

As an alternative or in addition thereto, provision may also be made for the at least two blocking devices to be capable of being opened successively. In this way, differently directed air streams through the workpiece can be produced in succession, whereby this can be advantageous in order to dislodge jammed particles from the workpiece, this being something that cannot be done when the particles are subjected to an air stream from only one side.

In a particularly flexibly employable embodiment of the cleaning device in accordance with the invention, the suction apparatus comprises at least two vacuum tanks and, for each of the vacuum tanks, at least one ventilation line for connecting the vacuum tank to the workpiece and at least one blocking device for blocking off the connection between the respective vacuum tank and the workpiece. Hereby, the at least two vacuum tanks can be adapted to be ventilated simultaneously or successively. If the cleaning device advantageously comprises at least one evacuation device by means of which at least two vacuum tanks of the suction apparatus are evacuable, then the amount of equipment needed for the evacuation of the vacuum tank can be reduced.

The evacuation device for evacuating one or more vacuum tanks preferably comprises at least one vacuum pump, at least one suction line for connecting the vacuum pump to at least one vacuum tank and at least one blocking device for blocking off the connection between the vacuum pump and the vacuum tank.

Furthermore, the suction apparatus of the cleaning device in accordance with the invention preferably comprises at least one separating device for separating out impurities from an air stream which flows from the workpiece to the vacuum tank.

Such a separating device can, in particular, comprise a gravity separator.

As an alternative or in addition thereto, provision may also be made for the at least one separating device to comprise a filter element, a bag filter or a filter screen for example.

In order to enable the separating device to continue to be used after a plurality of suction processes, it is expedient if the suction apparatus comprises an extraction device by means of which separated impurities are removable from the separating device.

The separating device may be provided downstream of the blocking device, i.e. on that side of the blocking device nearest the vacuum tank. In this case, the separating device is evacuated together with the vacuum tank.

As an alternative thereto, the separating device may be provided upstream of the blocking device, i.e. on that side of the blocking device nearest to the workpiece. In this case, the separating device remains at the ambient pressure until the opening of the blocking device.

A particularly space-saving construction of the cleaning device results if the separating device is arranged within the vacuum tank.

As an alternative thereto, provision may also be made for the separating device to be arranged between the workpiece and the vacuum tank.

In a special embodiment of the cleaning device in accordance with the invention, provision is made for the vacuum tank to be in the form of a vacuum chamber into which a workpiece other than the one currently being subjected to the suction process can be placed.

In particular, provision may be made for the vacuum tank to be in the form of a vacuum drying chamber. In consequence, a very economic combination of a vacuum drying process and a vacuum suction process is created. The vacuum drying chamber is in any case evacuated so as to accomplish the vacuum drying process therein. The vacuum drying chamber is ventilated after the vacuum drying process; this ventilation process can be used for the vacuum suction process.

Furthermore, the present invention relates to a method for cleaning a workpiece which comprises the following processing steps:

- connecting a vacuum tank to the workpiece by means of a ventilation line in which a blocking device is arranged for blocking off the connection between the vacuum tank and the workpiece;
- evacuating the vacuum tank by means of an evacuation device;
- ventilating the vacuum tank by opening the blocking device whereby impurities are sucked out from an interior of the workpiece.

By virtue of this method, the object of sucking out impurities from the interior of the workpiece by means of a particularly large suction effect is achieved.

Special embodiments of the method in accordance with the invention, the advantages thereof having already been previously described in connection with the special embodiments of the cleaning device in accordance with the invention.

Further features and advantages of the invention form the subject matter of the following description and the graphical illustration of exemplary embodiments.

BRIEF DESCRIPTION OF THE DRAWINGS

Similar or functionally equivalent elements are designated by the same reference symbols in each of the Figures.

DETAILED DESCRIPTION OF THE DRAWINGS

Figure 1:
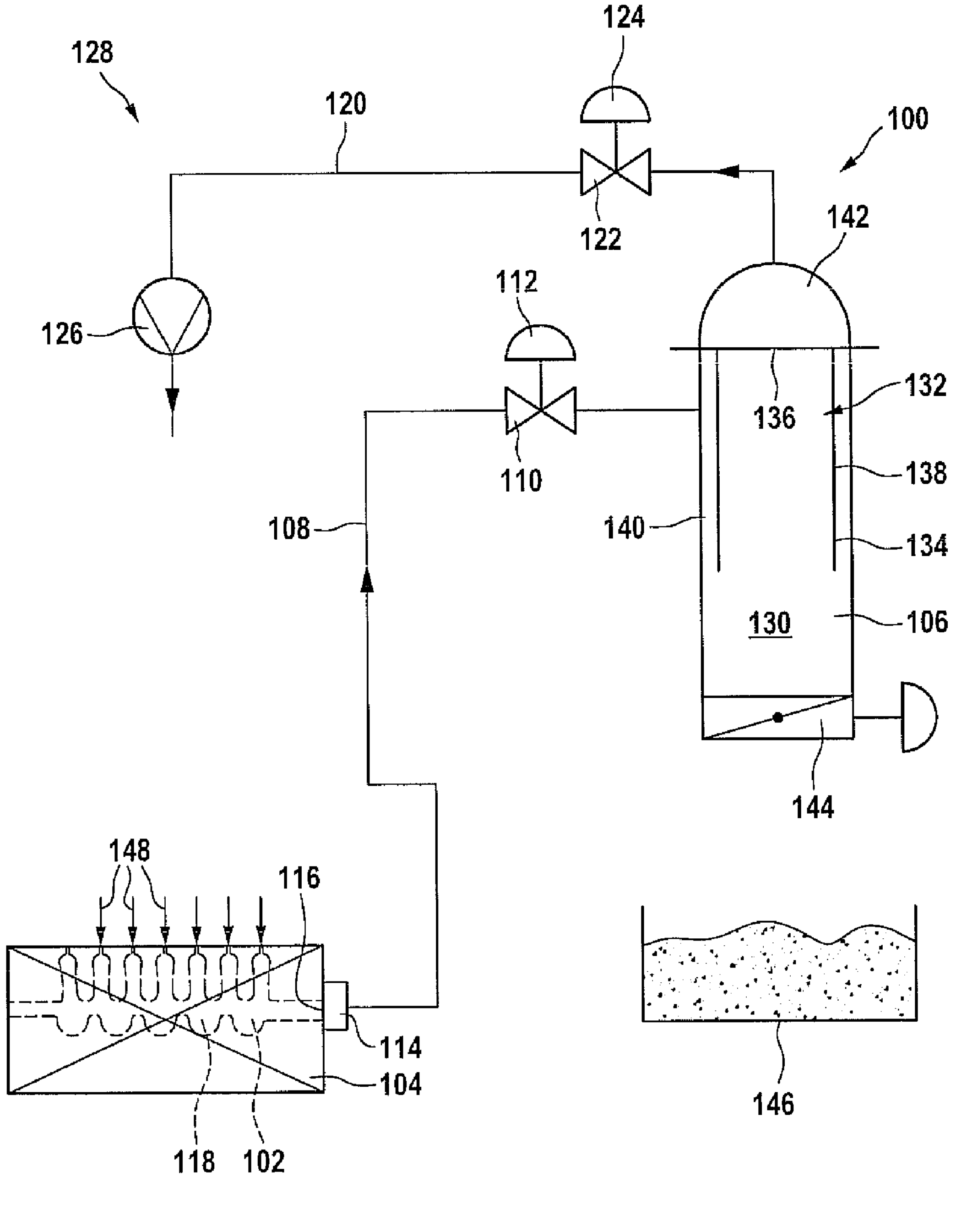
FIG. 1 shows a schematic illustration of a suction apparatus in an industrial cleaning device for cleaning workpieces, which comprises a vacuum tank having an integrated separating device.

Illustrated in FIG. 1 and bearing the general reference 100 therein is a suction apparatus for sucking out impurities from an interior 102 of a workpiece 104, a cylinder head or a crank case for example, said apparatus comprising a vacuum tank 106 which is connected to the workpiece 104 by a ventilation line 108 in which there is arranged a blocking device 110 in the form of an e.g. electric motor driven, or electromagnetically or pneumatically operable non-return valve 112.

Hereby, a workpiece-end connecting piece 114 of the ventilation line 108 is arranged on an exterior surface of the workpiece 104 in such a way that it surrounds an outlet opening 116 of a cavity 118 provided in the workpiece 104 in a substantially gas-tight manner.

Furthermore, the vacuum tank 106 is attached, via a suction line 120 in which there is arranged a blocking device 122 in the form of an e.g. electric motor driven, or electromagnetically or pneumatically operable stop valve 124, to the suction side of a vacuum pump 126 which forms an evacuation device 128 together with the suction line 120 for evacuating the interior 130 of the vacuum tank 106.

A separating device 132 which comprises a gravity separator 134 for separating out impurities from an air stream entering the interior 130 of the vacuum tank 106 is integrated into the vacuum tank 106.

The gravity separator 134 can, for example, comprise a hollow cylinder 138 which projects downwardly from a horizontal partition 136 extending over the horizontal cross section of the vacuum tank 106 and bounds a gap 140 remaining between the outer wall of the hollow cylinder 138 and the inner wall of the vacuum tank 106, the ventilation line 108 coming from the workpiece 104 opening out into said gap.

The interior of the hollow cylinder 138 communicates via a (not illustrated) passage opening in the horizontal partition 136 with a suction chamber 142 in the upper part of the vacuum tank 106 into which the suction line 120 leading to the vacuum pump 126 opens out.

The vacuum tank 106 is closed at the bottom end thereof by means of a closure flap 144.

Below the vacuum tank 106, there is arranged a collector tank 146 for receiving the impurities which are removed from the vacuum tank 106 via the closure flap 144 and which have been separated out from the air stream flowing into the vacuum tank 106 by means of the separating device 132.

The previously described suction apparatus 100 functions as follows:

In an evacuation phase of the suction apparatus 100, the non-return valve 112 in the ventilation line 108 is closed and the stop valve 124 in the suction line 120 is opened.

The volume of the interior 130 of the vacuum tank can amount to approximately 200 l for example.

The interior 130 of the vacuum tank 106 is evacuated by means of the vacuum pump 126 from the ambient pressure of approximately 950 mbar for example to a final pressure of approximately 20 mbar for example.

After reaching the final pressure of 20 mbar for example, the stop valve 124 in the suction line 120 is closed.

Then, the non-return valve 112 in the ventilation line 108 is opened abruptly.

A high negative pressure is thus produced for a brief period in the interior 102 of the workpiece 104, this causing the ambient air to penetrate at high speed through each of the openings, via which the interior 102 of the workpiece 104 communicates with the surrounding atmosphere, into the cavities 118 in the interior of the workpiece 104, whereby the impurities that are present there in the form of particles are whirled up and entrained in the direction of the connecting piece 114 of the ventilation line 108.

The direction of flow of the air from the surrounding atmosphere into the interior 102 of the workpiece 104 is indicated by the arrows 148 in FIG. 1.

The whirled up particles are conveyed to the vacuum tank 106 in the air stream which is flowing through the ventilation line 108 into the interior 130 of the vacuum tank 106, said particles thereby reaching the gap 140 between the hollow cylinder 138 and the inner wall of the vacuum tank 106 and failing to the bottom of the vacuum tank 106 due to the effects of the force of gravity.

The air stream from the workpiece 104 to the vacuum tank 106 ends when the pressure in the interior 130 of the vacuum tank 106 has risen to the external pressure of approximately 950 mbar for example.

Subsequently, the non-return valve 112 in the ventilation line 108 is closed and the stop valve 124 in the suction line 120 is opened in order to initiate a further evacuation phase of the suction apparatus 100.

During this evacuation phase, the workpiece 104 is separated from the ventilation line 108 and the next workpiece 104 requiring processing is attached to the ventilation line 108.

After a sequence of duty cycles of the suction apparatus 100 when a certain quantity of the impurities has accumulated on the bottom of the vacuum tank 106, the closure flap 144 is opened (whilst the vacuum tank 106 is ventilated) in order to let the impurities that have accumulated on the bottom of the vacuum tank 106 fall through the opened closure flap 144 into the collector tank 146 arranged therebelow due to the effects of the force of gravity.

After the subsequent closing of the closure flap 144, a further duty cycle of the suction apparatus 100 can begin with an evacuation phase.

Figure 2:
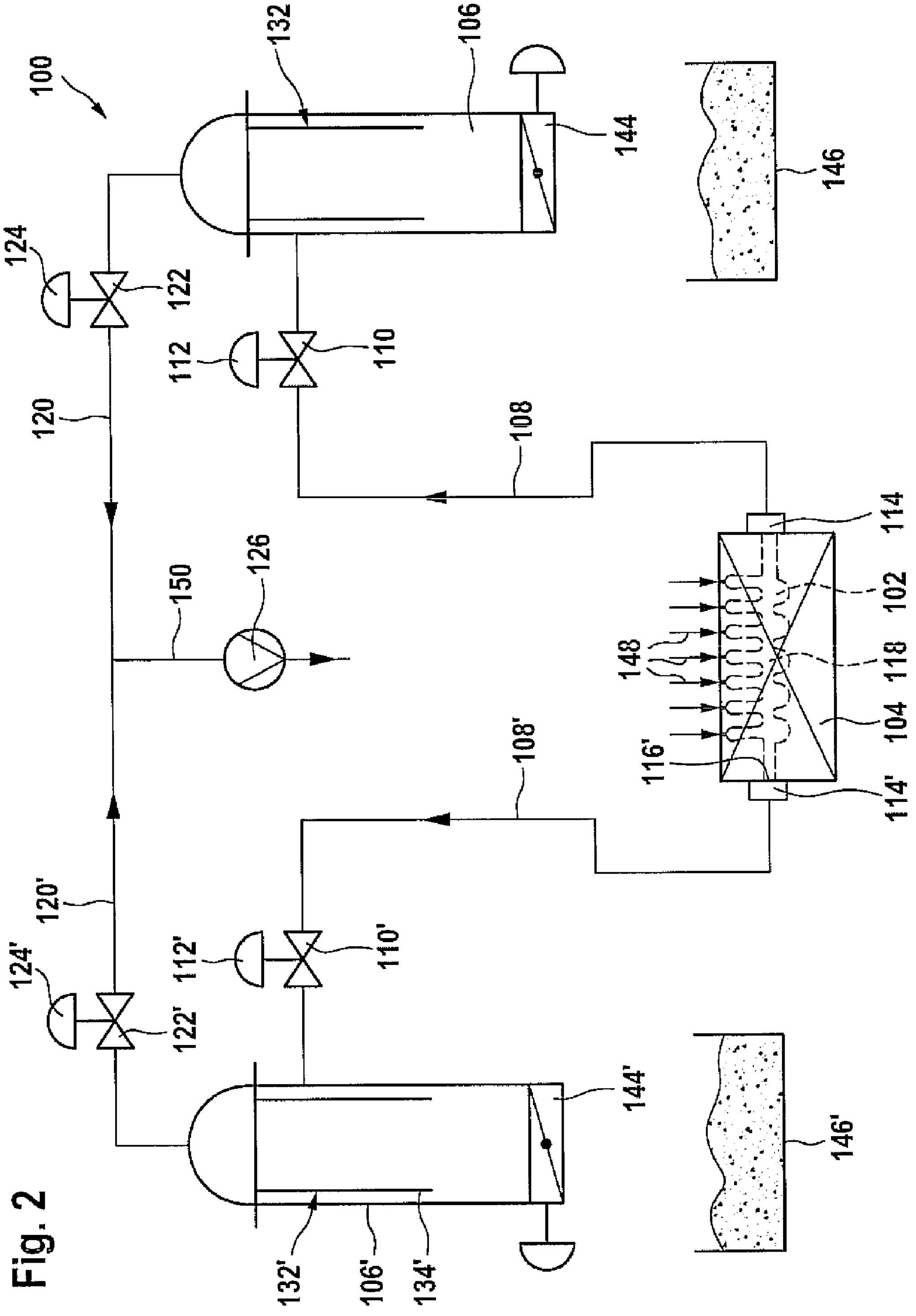
FIG. 2 a schematic illustration of a second embodiment of a suction apparatus for a cleaning device which comprises two vacuum tanks that are connected to a workpiece by two separate ventilation lines incorporating separate blocking devices.

A second embodiment of a suction apparatus 100 for a cleaning device for cleaning workpieces which is illustrated in FIG. 2 differs from the first embodiment illustrated in FIG. 1 in that, in addition to the first vacuum tank 106, provision is made for a further vacuum tank 106', which is connected to the interior 102 of the workpiece 104 by a further ventilation line 108' incorporating a blocking device 110' in the form of a non-return valve 112'.

The connecting piece 114' of the second ventilation line 108' surrounds an outlet opening 116' other than that surrounded by the connecting piece 114 of the first ventilation line 108.

The two ventilation lines 108, 108' can be connected to different entrances to the same cavity 118 of the workpiece 104 or to entrances to different cavities within the workpiece 104.

Furthermore, the second vacuum tank 106' is connected to the suction end of the vacuum pump 126 by a suction line 120' in which a blocking device 122' in the form of a stop valve 124' is arranged.

In order to enable the vacuum pump 126 to be used for the evacuation of both vacuum tanks 106, 106', the two suction lines 120, 120' coming from the respective two vacuum tanks 106 and 106' are united in a common suction line end piece 150 which is attached to the vacuum pump 126.

The second vacuum tank 106' can be constructed in exactly the same manner as the first vacuum tank 106.

Below the second vacuum tank 106', there is arranged a second collector tank 146' for receiving impurities which have collected at the bottom of the second vacuum tank 106' during the operation of the suction apparatus 100.

A separating device 132' in the form of a gravity separator 134' is integrated into the second vacuum tank 106' in like manner to the first vacuum tank 106.

The two ventilation lines 108, 108' are preferably attached to mutually opposite end faces of the workpiece 104.

The two vacuum tanks 106, 106' are evacuated at the same time or successively by means of the vacuum pump 126 to a final pressure of approximately 20 mbar for example, whereby the stop valve 124, 124' in the suction line 120 or 120' that is associated with the respective vacuum tank 106, 106' is opened, whilst the non-return valve 112, 112' in the ventilation line 108 or 108' that is associated with the respective vacuum tank 106, 106' is closed.

After the evacuation process has occurred, the vacuum tanks 106, 106' can be ventilated at the same time or successively via the respectively associated ventilation line 108 or 108', whereby impurities from the interior 102 of the workpiece 104 are then conveyed by the air stream entering the workpiece 104 to either both vacuum tanks 106, 106' at the same time, or, successively, first to the one vacuum tank 106 and then to the other vacuum tank 106'.

It is also possible for the suction apparatus of FIG. 2 to be operated in such a manner that a respective one of the vacuum tanks 106, 106' is being ventilated during the time period wherein the other vacuum tank 106', 106 is actually being evacuated.

The impurities accumulating at the bottom of the vacuum tanks 106, 106' are transferred into the respectively associated collector tank 146 and 146' by the opening of the respective closure flap 144 and 144' as and when necessary.

In all other respects, the second embodiment of a suction apparatus 100 for a cleaning device that is illustrated in FIG. 2 is identical to the first embodiment illustrated in FIG. 1 in regard to the construction and functioning thereof, so that to this extent, reference should be made to the preceding description.

Figure 3:
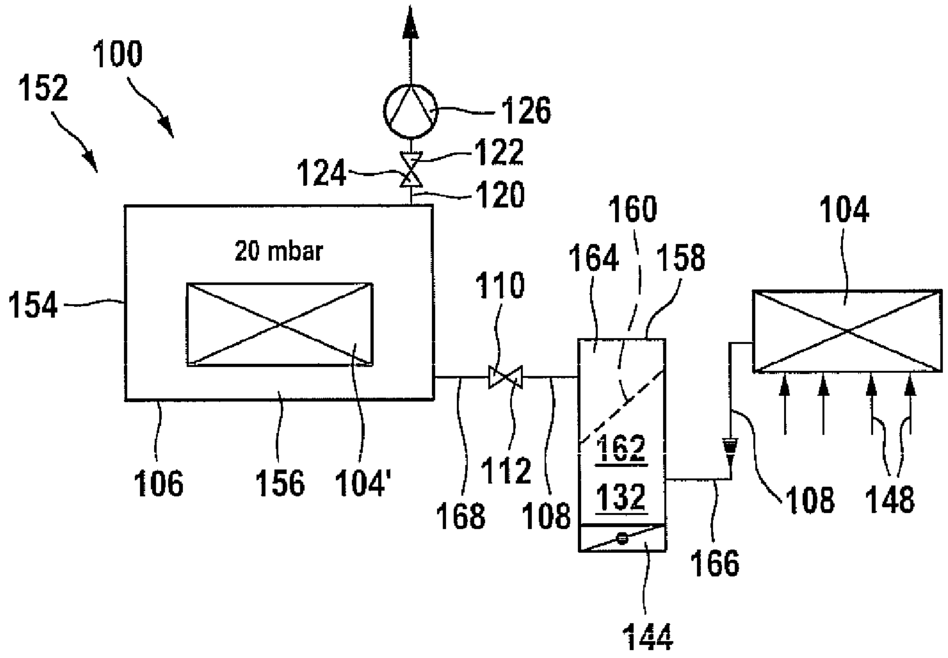
FIG. 3 a schematic illustration of a third embodiment of a suction apparatus for a cleaning device which comprises a vacuum tank in the form of a vacuum drying chamber and a separating device switched between the vacuum drying chamber and the workpiece.

A third embodiment of a suction apparatus 100 forms a component of a cleaning device for cleaning workpieces 104 bearing the general reference 152 and illustrated in FIG. 3, which, apart from the suction apparatus 100, also comprises a (not illustrated) wet cleaning device in which, after the impurities have been sucked out from the interior 102 of the workpieces 104, the workpieces 104 are cleaned in a wet process which, for example, comprises an alternating flushing process, subjection of the workpieces 104 to a high pressure cleaning agent and/or a pulsating cleaning process. Furthermore, the cleaning device 152 comprises a vacuum drying chamber 154 which is attached via a suction line 120 incorporating a blocking device 122 in the form of a stop valve 124 to a vacuum pump 126 by means of which the vacuum drying chamber 154 can be evacuated to a final pressure of approximately 20 mbar for example.

A wet-cleaned workpiece 104' can be brought into the interior 156 of the vacuum drying chamber 154 in order to be subjected to a vacuum drying process.

The interior 156 of the vacuum drying chamber 154 is connected via a ventilation line 108 to the interior of a workpiece 104 requiring the suction process.

A blocking device 110 in the form of a non-return valve 112 is arranged in the ventilation line 108.

A separating device 132 is provided in the ventilation line 108 upstream of the non-return valve 112, said separating device in this embodiment comprising a vacuum-compatible container 158 which is divided by a filter element 160, a filter screen for example, into an incoming flow chamber 162 and an outgoing flow chamber 164.

The incoming flow chamber 162 is connected by a workpiece-end section 166 of the ventilation line 108 to the workpiece 104, whilst the outgoing flow chamber 164 is connected by a drying-chamber-end section 168 of the ventilation line 108 to the vacuum drying chamber 154.

A closure flap 144 by means of which impurities that have been separated out in the separating device 132 are removable from the separating device 132 is provided at the bottom of the incoming flow chamber 162 of the vacuum-compatible container 158.

In this embodiment of a suction apparatus 100, the vacuum drying chamber 154 serves as the vacuum tank 106 which is pre-evacuated and then afterwards ventilated by the abrupt opening of the blocking device 110 in order to suck in ambient air through the interior 102 of the workpiece 104 and the ventilation line 108 into the vacuum drying chamber 154 due to the difference in pressure between the interior 156 and the outer environment (having an external pressure of approximately 950 mbar for example), whereby impurities are conveyed from the interior 102 of the workpiece 104 into the separating device 132 and are separated therein from the air stream by means of the filter element 160.

In this way, the ventilation of the vacuum drying chamber 154 that is in any case necessary at the end of the vacuum drying process in the vacuum drying chamber 154 can be used at the same time for sucking out the workpiece 104 that is currently present outside the vacuum drying chamber 154.

In this embodiment of a suction apparatus 100, the interior of the separating device 132 is at the ambient pressure of e.g. approximately 950 mbar both before and after the ventilation phase.

In all other respects the third embodiment of a suction apparatus 100 for a cleaning device that is illustrated in FIG. 3 is identical to the first embodiment illustrated in FIG. 1 in regard to the construction and functioning thereof, so that to this extent, reference should be made to the preceding description.

Figure 4:
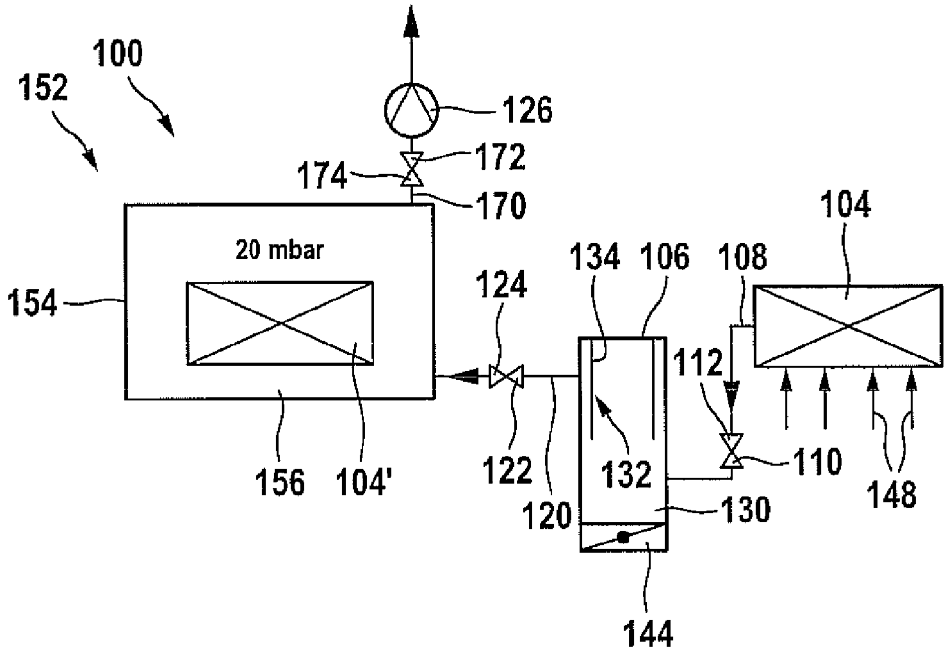
FIG. 4 a schematic illustration of a fourth embodiment of a suction apparatus for a cleaning device in which the separating device is integrated into the vacuum tank and the vacuum tank can be evacuated by a vacuum drying chamber and is separable from the vacuum drying chamber after the evacuation process and is adapted to be separately ventilated via the workpiece.

A fourth embodiment of a suction apparatus 100 for a cleaning device 152 that is illustrated in FIG. 4 comprises a vacuum tank 106 which is attached via a ventilation line 108 incorporating a blocking device 110 in the form of a non-return valve 112 to a workpiece 104 requiring the suction process and via a suction line 120 incorporating a blocking device 122 in the form of a stop valve 124 to a vacuum drying chamber 154 of the cleaning device 152.

For its part, the interior 156 of the vacuum drying chamber 154 is connected via a suction line 170 having a blocking device 172 arranged therein to a vacuum pump 126.

A separating device 132 in the form of a gravity separator 134 for example, is integrated into the vacuum tank 106.

A closure flap 144, by means of which impurities separated out by the separating device 132 are removable from the interior 130 of the vacuum tank 106, is provided at the bottom of the vacuum tank 106.

In this embodiment of a suction apparatus 100, the vacuum tank 106 together with the vacuum drying chamber 154 are evacuated to a final pressure of approximately 20 mbar for example. During this evacuation phase, the stop valve 124 in the suction line 120 and the stop valve 174 in the suction line 170 are opened, whilst the non-return valve 112 in the ventilation line 108 is closed.

The vacuum pump 126 can thus be used for both the evacuation of the vacuum drying chamber 154 and for the evacuation of the vacuum tank 106.

After the evacuation of the vacuum tank 106 has occurred, the vacuum tank 106 is separated from the interior 156 of the vacuum drying chamber 154 by the closure of the stop valve 124.

Subsequently, the vacuum tank 106 is ventilated, separately and independently of the vacuum drying chamber 154, by the abrupt opening of the non-return valve 112 in the ventilation line 108 in order to suck in air from the environment through the interior 102 of the workpiece 104 to the vacuum tank 106 and thereby convey impurities from the interior 102 of the workpiece 104 and into the separating device 132 which separates out these impurities from the air stream.

The vacuum drying chamber 154 can likewise be ventilated, separately and independently of the vacuum tank 106, upon completion of the vacuum drying process for the workpiece 104' arranged in the vacuum drying chamber 154.

Subsequently, the vacuum drying chamber 154 and the vacuum tank 106 can then be evacuated together by means of the vacuum pump 126, as already previously described.

In all other respects, the fourth embodiment of a suction apparatus 100 for a cleaning device 152 that is illustrated in FIG. 4 is identical to the first embodiment illustrated in FIG. 1 and the third embodiment illustrated in FIG. 3 in regard to the construction and functioning thereof, so that to this extent, reference should be made to the preceding description.

The invention claimed is:

1. A cleaning device for cleaning a workpiece comprising a suction apparatus for sucking out impurities from an interior of the workpiece, wherein the suction apparatus comprises at least one vacuum tank,
 at least one evacuation device for evacuating the vacuum tank,
 at least one ventilation line for connecting the vacuum tank to the workpiece and
 at least one blocking device for blocking off the connection between the vacuum tank and the workpiece,
 wherein the workpiece is provided with openings via which an interior of the workpiece communicates with the atmosphere surrounding the workpiece and through which ambient air penetrates into the interior of the workpiece when the blocking device is opened.

2. A cleaning device in accordance with claim 1, wherein the vacuum tank can be evacuated to a pressure of at most approximately 100 mbar, preferably of at most approximately 50 mbar.

3. A cleaning device in accordance with claim 1, wherein the blocking device can be opened abruptly.

4. A cleaning device in accordance with claim 1, wherein the blocking device can be fully opened within a period of at most approximately 2 seconds, and preferably of at most approximately 0.5 seconds.

5. A cleaning device in accordance with claim 1, wherein the vacuum tank is adapted to be ventilated within an opening time of the blocking device of at most approximately 2 seconds in such a manner that its internal pressure amounts to at least 90% of the external pressure.

6. A cleaning device in accordance with claim 1, wherein the workpiece comprises at least one cavity which opens out at least one point on the exterior of the workpiece.

7. A cleaning device in accordance with claim 1, wherein the suction apparatus comprises a plurality of ventilation lines which can be arranged at different positions on the exterior of the workpiece at the same time.

8. A cleaning device in accordance with claim 7, wherein at least two of the ventilation lines are adapted to be blocked separately by means of at least two mutually different blocking devices.

9. A cleaning device in accordance with claim 8, wherein the at least two blocking devices can be opened at the same time.

10. A cleaning device in accordance with claim 8, wherein the at least two blocking devices can be opened successively.

11. A cleaning device in accordance with claim 1, wherein the suction apparatus comprises at least two vacuum tanks and, for each of the vacuum tanks, at least one ventilation line for connecting the vacuum tank to the workpiece and at least one blocking device for blocking off the connection between the respective vacuum tank and the workpiece.

12. A cleaning device in accordance with claim 11, wherein the cleaning device comprises at least one evacuation device by means of which at least two vacuum tanks of the suction apparatus can be evacuated.

13. A cleaning device in accordance with claim 11, wherein the evacuation device comprises at least one vacuum pump, at least one suction line for connecting the vacuum pump to at least one vacuum tank and at least one blocking device for blocking off the connection between the vacuum pump and the vacuum tank.

14. A cleaning device in accordance with claim 1, wherein the suction apparatus comprises at least one separating device for separating impurities from an air stream which flows from the workpiece to the vacuum tank.

15. A cleaning device in accordance with claim 14, wherein the at least one separating device comprises a gravity separator.

16. A cleaning device in accordance with claim 14, wherein the at least one separating device comprises a filter element.

17. A cleaning device in accordance with claim 14, wherein the suction apparatus comprises an extraction device by means of which separated impurities are removable from the separating device.

18. A cleaning device in accordance with claim 14, wherein the separating device is provided downstream of the blocking device.

19. A cleaning device in accordance with claim 14, wherein the separating device is provided upstream of the blocking device.

20. A cleaning device in accordance with claim 14, wherein the separating device is arranged within the vacuum tank.

21. A cleaning device in accordance with claim 14, wherein the separating device is arranged between the workpiece and the vacuum tank.

22. A cleaning device in accordance with claim 1, wherein the vacuum tank is in the form of a vacuum chamber into which a workpiece can be placed.

23. A cleaning device in accordance with claim 22, wherein the vacuum tank is in the form of a vacuum drying chamber.

24. A method for cleaning a workpiece, comprising the following processing steps:
 connecting a vacuum tank to the workpiece by means of a ventilation line in which a blocking device is arranged for blocking off the connection between the vacuum tank and the workpiece;
 evacuating the vacuum tank by means of an evacuation device;
 ventilating the vacuum tank by opening the blocking device whereby impurities are sucked out from an interior of the workpiece;
wherein the workpiece is provided with openings via which an interior of the workpiece communicates with the atmosphere surrounding the workpiece and wherein ambient air penetrates into the interior of the workpiece when the blocking device is opened.

25. A method in accordance with claim 24, wherein the vacuum tank is evacuated to a pressure of at most approximately 100 mbar, preferably of at most approximately 50 mbar.

26. A method in accordance with claim 24, wherein the blocking device is opened abruptly.

27. A method in accordance with claim 24, wherein the blocking device is fully opened within a period of at most approximately 2 seconds, preferably of at most approximately 0.5 seconds.

28. A method in accordance with claim 24, wherein the vacuum tank is ventilated within an opening time of the blocking device of at most approximately 2 seconds in such a manner that its internal pressure amounts to at least 90% of the external pressure.

29. A method in accordance with claim 24, wherein the workpiece comprises at least one cavity which opens out at least one point on an exterior of the workpiece.

30. A method in accordance with claim 24, wherein a plurality of ventilation lines are arranged at different points on the exterior of the workpiece at the same time.

31. A method in accordance with claim 30, wherein at least two of the ventilation lines are separately closed by means of at least two mutually different blocking devices.

32. A method in accordance with claim 31, wherein the at least two blocking devices are opened at the same time.

33. A method in accordance with claim 31, wherein the at least two blocking devices are opened successively.

34. A method in accordance with claim 24, wherein at least two vacuum tanks are connected to the workpiece by at least one respective ventilation line in which at least one respective blocking device for blocking off the connection between the respective vacuum tank and the workpiece is arranged.

35. A method in accordance with claim 34, wherein at least two vacuum tanks are evacuated by means of the same evacuation device.

36. A method in accordance with claim 24, wherein the evacuation device comprises at least one vacuum pump, at least one suction line for connecting the vacuum pump to at least one vacuum tank and at least one blocking device for blocking off the connection between the vacuum pump and the vacuum tank.

37. A method in accordance with claim 24, wherein impurities are separated out from an air stream which flows from the workpiece to the vacuum tank by means of a separating device.

38. A method in accordance with claim 37, wherein the impurities are separated from the air stream by means of a gravity separator.

39. A method in accordance with claim 37, wherein impurities are separated from the air stream by means of a filter element.

40. A method in accordance with claim 37, wherein separated impurities are removed from the separating device by means of an extraction device.

41. A method in accordance with claim 37, wherein the impurities are separated downstream of the blocking device.

42. A method in accordance with claim 24, wherein the impurities are separated upstream of the blocking device.

43. A method in accordance with claim 24, wherein the impurities are separated within the vacuum tank.

44. A method in accordance with claim 24, wherein the impurities are separated externally of the vacuum tank.

45. A method in accordance with claim 24, wherein a workpiece is brought into the vacuum tank.

46. A method in accordance with claim 45, wherein the workpiece placed in the vacuum tank is subjected to a vacuum drying process.

* * * * *